US009864444B2

(12) United States Patent
Lee et al.

(10) Patent No.: US 9,864,444 B2
(45) Date of Patent: Jan. 9, 2018

(54) DISPLAY DEVICE INCLUDING A TOUCH PANEL THAT DETECTS TOUCH BASED ON SENSING SIGNAL DELAY

(71) Applicant: SAMSUNG DISPLAY CO., LTD., Yongin, Gyeonggi-Do (KR)

(72) Inventors: Kangwon Lee, Seoul (KR); Won-Ki Hong, Suwon-si (KR); Seungho Nam, Seongnam-si (KR); Taehyeog Jung, Hwaseong-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 157 days.

(21) Appl. No.: 14/489,576

(22) Filed: Sep. 18, 2014

(65) Prior Publication Data

US 2015/0212635 A1    Jul. 30, 2015

(30) Foreign Application Priority Data

Jan. 28, 2014  (KR) .................. 10-2014-0010635

(51) Int. Cl.
*G06F 3/041*    (2006.01)
*G06F 3/044*    (2006.01)

(52) U.S. Cl.
CPC ............ *G06F 3/0412* (2013.01); *G06F 3/044* (2013.01); *G06F 3/0416* (2013.01)

(58) Field of Classification Search
CPC ....... G06F 3/0412; G06F 3/0416; G06F 3/044
See application file for complete search history.

(56) References Cited

U.S. PATENT DOCUMENTS

| 2005/0126831 | A1* | 6/2005 | Richter | ................... | G06F 3/045 |
| | | | | | 178/18.01 |
| 2006/0097991 | A1* | 5/2006 | Hotelling | .............. | G06F 3/0416 |
| | | | | | 345/173 |
| 2009/0153509 | A1* | 6/2009 | Jiang | ..................... | G06F 3/0416 |
| | | | | | 345/173 |
| 2009/0267916 | A1 | 10/2009 | Hotelling | | |
| 2010/0051354 | A1* | 3/2010 | Ningrat | ................... | G06F 3/044 |
| | | | | | 178/18.06 |
| 2010/0090979 | A1 | 4/2010 | Bae | | |

(Continued)

FOREIGN PATENT DOCUMENTS

| KR | 1020090081856 | 7/2009 |
| KR | 1020110135131 | 12/2011 |

(Continued)

*Primary Examiner* — Ram Mistry
(74) *Attorney, Agent, or Firm* — F. Chau & Associates, LLC

(57) ABSTRACT

A touch-sensitive display device is provided. The touch-sensitive display device includes a display panel and a touch panel. The display panel includes first and second substrates facing each other. The display panel is configured to display images through the second substrate. The touch panel is disposed on the second substrate and is configured to detect a touch event. The touch panel includes sensing electrodes spaced apart from each other, a conductive layer, and a touch processor. The conductive layer is electrically separated from the sensing electrodes. The touch processor is configured to provide sensing signals to the sensing electrodes and to obtain touch coordinates to which the touch event is input based on delay values of the sensing signals.

20 Claims, 14 Drawing Sheets

(56) References Cited

U.S. PATENT DOCUMENTS

| | | |
|---|---|---|
| 2011/0050638 A1 | 3/2011 | Lee |
| 2011/0080373 A1 | 4/2011 | Wang et al. |
| 2012/0062511 A1 | 3/2012 | Ishizaki et al. |
| 2013/0120314 A1 | 5/2013 | Ishibashi et al. |
| 2013/0154973 A1* | 6/2013 | Tung ................ G06F 3/016 345/173 |
| 2014/0139480 A1* | 5/2014 | Seo .................. G06F 3/044 345/174 |

FOREIGN PATENT DOCUMENTS

| | | |
|---|---|---|
| KR | 1020120005235 | 1/2012 |
| KR | 1020120010359 | 2/2012 |
| KR | 1020130016651 | 2/2013 |

* cited by examiner

| 0.44 | 0.64 | 1.08 | 1.44 | 1.08 | 0.64 | 0.44 |
| --- | --- | --- | --- | --- | --- | --- |
| 0.64 | 1.3 | 2.99 | 5.01 | 2.99 | 1.3 | 0.64 |
| 1.08 | 2.99 | 8.55 | 18.07 | 8.55 | 2.99 | 1.08 |
| 1.44 | 5.01 | 18.07 | Touch | 18.07 | 5.01 | 1.44 |
| 1.08 | 2.99 | 8.55 | 18.07 | 8.55 | 2.99 | 1.08 |
| 0.64 | 1.3 | 2.99 | 5.01 | 2.99 | 1.3 | 0.64 |
| 0.44 | 0.64 | 1.08 | 1.44 | 1.08 | 0.64 | 0.44 |

DISPLAY DEVICE INCLUDING A TOUCH PANEL THAT DETECTS TOUCH BASED ON SENSING SIGNAL DELAY

CROSS-REFERENCE TO RELATED APPLICATIONS

This patent application claims priority under 35 U.S.C. §119 to Korean Patent Application No. 10-2014-0010635, filed on Jan. 28, 2014, in the Korean Intellectual Property Office, the disclosure of which is incorporated by reference herein in its entirety.

TECHNICAL FIELD

The present inventive concept relates to a display device, and particularly, to a display device including a touch panel.

DISCUSSION OF THE RELATED ART

Display devices using a touch panel to receive a user's input have been developed.

There are several types of touch panels. Touch panels are configured to detect touch events thereon. Touch panels depend on parameters sensed to detect a touch event by a user such as a resistance, a capacitance, surface acoustic wave, infrared light or the like. In the capacitance-based touch panel, a difference in capacitance between before and after the touch event is sensed to determine whether the touching event occurs. The capacitance-based touch panel includes a self-capacitance type touch panel and a mutual-capacitance type touch panel.

In the self-capacitance type touch panel, the touch panel may include a plurality of electrodes provided spaced apart from each other on a touch substrate, and the presence or absence of the touching event may be monitored by applying a signal to the electrodes and measuring a delay value of the applied signal.

SUMMARY

According to an exemplary embodiment of the present inventive concept, a touch-sensitive display device is provided. The touch-sensitive display device includes a display panel and a touch panel.

The display panel includes first and second substrates facing each other. The display panel is configured to display images through the second substrate. The touch panel is disposed on the second substrate. Touch panel is configured to detect a touch event. The touch panel includes a plurality of sensing electrodes, a conductive layer, and a touch processor. The plurality of sensing electrodes is spaced apart from each other. The conductive layer is electrically separated from the plurality of sensing electrodes. The touch processor is configured to provide sensing signals to the plurality of sensing electrodes and to obtain touch coordinates to which the touch event is input based on delay values of the sensing signals.

In an exemplary embodiment of the present inventive concept, the plurality of sensing electrodes may include a first sensing electrode, a second sensing electrode, and a third sensing electrode. The touch event may be input to the first sensing electrode. The touch event might not be input to the second and third sensing electrodes. A first delay value of a first sensing signal corresponding to the first sensing electrode and a second delay value of a second sensing signal corresponding to the second sensing electrode may be different from each other.

In an exemplary embodiment of the present inventive concept, a third delay value of a third sensing signal corresponding to the third sensing electrode may be smaller than the second delay value. A distance between the first and third sensing electrodes may be greater than a distance between the first and second sensing electrodes.

In an exemplary embodiment of the present inventive concept, the conductive layer may include substantially transparent material. The conductive layer may include conductive polymers having PEDOT:PSS, oxide-based transparent conductive materials, or carbon-based transparent conductive materials. The oxide-based transparent conductive materials may include indium-tin-oxide or indium-zinc-oxide. The carbon-based transparent conductive materials may include carbon nanotube or grapheme. The conductive layer may have a sheet resistance ranging from 50 k$\Omega$/□ to 200 k$\Omega$/□.

In an exemplary embodiment of the present inventive concept, the touch panel may further include a touch substrate, a first insulating layer, and a second insulating layer. The touch event may be input to the touch panel. The first insulating layer may be disposed on the conductive layer. The second insulating layer may be disposed between the first insulating layer and the second substrate. The conductive layer may be disposed between the touch substrate and the first insulating layer. The plurality of sensing electrodes may be disposed between the first insulating layer and the second insulating layer.

In an exemplary embodiment of the present inventive concept, the touch panel may further include a plurality of touch lines provided on the touch substrate to connect the plurality of sensing electrodes to the touch processor.

In an exemplary embodiment of the present inventive concept, the plurality of sensing electrodes may be provided in a form of i×j matrix, where i and j may be positive integers In an exemplary embodiment of the present inventive concept, first touch lines connected to sensing electrodes in a k-th column of the i×j matrix among the plurality of touch lines may be disposed between the k-th and (k+1)-th columns of the i×j matrix, where k may be a positive integer satisfying a condition of i≤k<j. A portion of each of the first touch lines may be extended in a first direction parallel to the k-th column.

In an exemplary embodiment of the present inventive concept, the second substrate may include an insulating substrate, an insulating layer, a black matrix, and a color filter. The insulating substrate may have a first surface and a second surface. The insulating layer may be disposed on the second surface of the insulating substrate. The black matrix may be disposed on the insulating layer. The color filter may be disposed on the black matrix.

In an exemplary embodiment of the present inventive concept, the conductive layer may be disposed over the first surface of the insulating substrate. The plurality of sensing electrodes may be disposed between the insulating substrate and the insulating layer.

In an exemplary embodiment of the present inventive concept, the touch panel may further include a touch substrate, an adhesive layer, and an insulating layer. The touch substrate may have a first surface and a second surface. The adhesive layer may be formed on the second surface of the touch substrate. The insulating layer may be disposed on the adhesive layer. The conductive layer may be disposed on the first surface of the touch substrate. The plurality of sensing electrodes may be disposed between the insulating layer and the second substrate.

In an exemplary embodiment of the present inventive concept, the touch substrate may include glass, PI, PC, PEN, or PET.

In an exemplary embodiment of the present inventive concept, the touch panel may further include a touch substrate, a first insulating layer, and a second insulating layer. The touch substrate may have a first surface and a second surface. The first insulating layer may be disposed on the first surface of the touch substrate. The second insulating layer may be disposed between the second surface of the touch substrate and the second substrate. The conductive layer may be disposed between the touch substrate and the first insulating layer. The plurality of sensing electrodes may be disposed between the second insulating layer and the touch substrate.

According to an exemplary embodiment of the present inventive concept, a touch-sensitive input device is provided. The touch-sensitive input device includes a display panel and a touch panel. The display panel is configured to display an image. The touch panel is configured to detect a touch event. The touch panel includes a conductive layer and a plurality of sensing electrodes. The sensing electrodes are spaced apart from each other. The plurality of sensing electrodes is disposed between the conductive layer and the display panel. The conductive layer is electrically separated from the plurality of sensing electrodes. A plurality of sensing signals corresponding to the plurality of sensing electrodes has different delay values from each other depending on a position of each of the plurality of sensing electrodes.

In an exemplary embodiment of the present inventive concept, wherein a first sensing electrode having a maximum delay value among the plurality of sensing electrodes may be determined as a position to which the touch event is input.

BRIEF DESCRIPTION OF THE DRAWINGS

Exemplary embodiments of the present inventive concept will be more clearly understood by reference to the following description when considered in connection with the accompanying drawings, wherein.

DETAILED DESCRIPTION OF THE DRAWINGS

Figure 1:
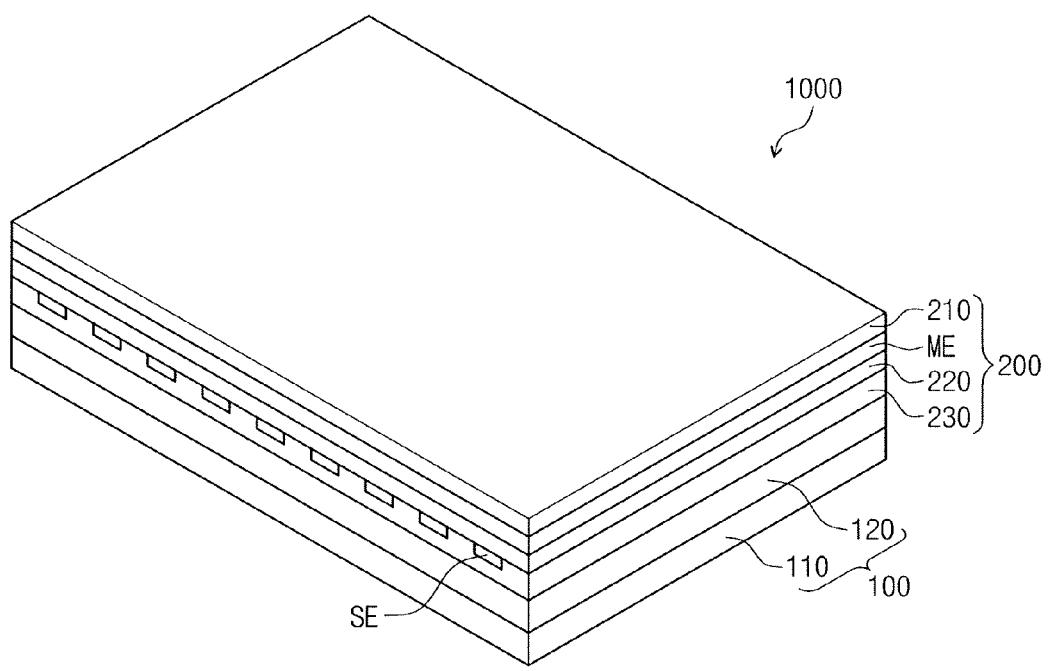
FIG. 1 is a perspective view illustrating a display device according to an exemplary embodiment of the present inventive concept.

Exemplary embodiments of the present inventive concepts will now be described more fully with reference to the accompanying drawings, in which exemplary embodiments are shown. The exemplary embodiments of the present inventive concepts may, however, be embodied in many different forms and should not be construed as being limited to the embodiments set forth herein; rather, these embodiments are provided so that this disclosure will be thorough and complete, and will fully convey the concept of exemplary embodiments to those of ordinary skill in the art. In the drawings, the thicknesses of layers and regions are exaggerated for clarity. Like reference numerals in the drawings may denote like elements, and thus their description may be omitted. It will be understood that when an element is referred to as being "on" to another element, it can be directly on the other element or intervening elements may be present.

As used herein, the singular forms "a," "an" and "the" are intended to include the plural forms as well, unless the context clearly indicates otherwise.

Figure 2:
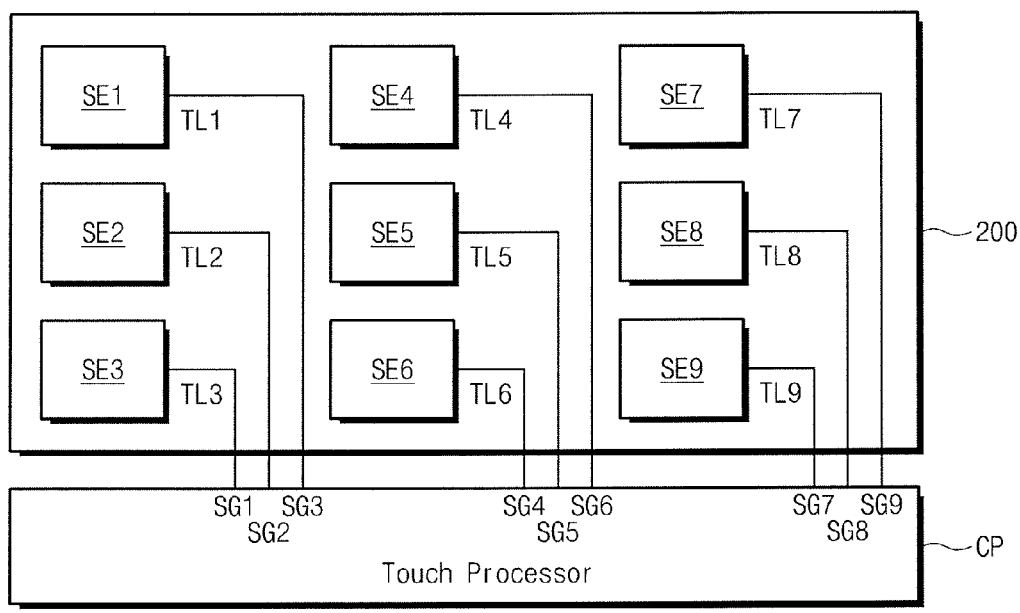
FIG. 2 is a plan view illustrating a touch panel and a touch processor illustrated in FIG. 1.

FIG. 1 is a perspective view illustrating a display device according to an exemplary embodiment of the present inventive concept, and FIG. 2 is a plan view illustrating a portion of the touch panel of FIG. 1.

Referring to FIG. 1, a display device 1000 may include a display panel 100 and a touch panel 200.

The display panel 100 may be configured to display images. The display panel 100 may include one of various display panels including a liquid crystal display panel, an organic light emitting display panel, a plasma display panel, an electrophoresis display panel, an electrowetting display panel, or the like.

For the sake of simplicity, hereinafter the description that follows will refer to an example in which a liquid crystal display panel is used as the display panel.

The display panel 100 may include a first substrate 110, a second substrate 120, and a liquid crystal layer (not shown). The first substrate 110 and the second substrate 120 may be disposed to face each other.

A plurality of gate lines, a plurality of data lines, a plurality of thin-film transistors, and a plurality of pixel electrodes may be provided on the first substrate 110. The gate lines and the data lines may be electrically separated from each other and may be disposed to cross each other. The thin-film transistors may be connected to the gate lines, the data lines, and the pixel electrodes. Each of the pixel electrodes may receive a data voltage through each of the thin-film transistors.

The second substrate 120 may include a black matrix, a color filter, and a common electrode. The black matrix may be overlapped with the gate lines, the data lines, and the thin-film transistors, when viewed in a plan view, to prevent an incident light from transmitting the black matrix. The color filter may be configured to allow a fraction of the incident light having a specific color or a specific wavelength to pass the color filter. The common electrode may be applied with a common voltage of a constant level. In an exemplary embodiment of the present inventive concept, the common electrode may be provided on or in the first substrate 110.

The liquid crystal layer may be disposed between the first substrate 110 and the second substrate 120. The liquid crystal layer may include a plurality of liquid crystal molecules. Orientations of the liquid crystal molecules may be changed by controlling an electric field produced between each pixel electrode and each common electrode, and thus, transmittance of light passing through the liquid crystal layer may be controlled.

The display panel 100 may be configured to display images through the second substrate 120.

The touch panel 200 may include a touch substrate 210, a conductive layer ME, a first insulating layer 220, a sensing electrodes SE, a second insulating layer 230, and a touch processor CP.

In the touch substrate 210, a touch event TCH input from a user may produce a touch signal. The touch substrate 210 may be formed of a flexible insulating material (e.g., plastic).

The touch substrate 210 may be provided in the form of a plate. When viewed in a plan view, the touch substrate 210 may have a shape similar to that of the display panel 100.

The conductive layer ME may be provided on the touch substrate 210. For example, the conductive layer ME may be formed to cover the entire surface of the touch substrate 210. The conductive layer ME may be a transparent conductive material. The conductive layer ME may include conductive polymers (e.g., poly(3,4-ethylene dioxythiophene):poly(styrene sulfonate) (PEDOT:PSS)), oxide-based transparent conductive materials, carbon-based transparent conductive materials, or the like. The oxide-based transparent conductive materials may include indium-tin-oxide, indium-zinc-oxide, or the like. The carbon-based transparent conductive materials may include carbon nanotube, grapheme, or the like.

The first insulating layer 220 may be disposed on the conductive layer ME. The first insulating layer 220 may include an organic insulating material, an inorganic insulating material, or the like and thus the conductive layer ME may be electrically isolated from other elements.

The sensing electrodes SE may be disposed on the first insulating layer 220. The number of the sensing electrodes provided on the first insulating layer 220 may be plural.

The second insulating layer 230 may be disposed on the sensing electrodes SE. The second insulating layer 230 may be formed of an organic insulating material or an inorganic insulating material and the sensing electrodes SE may be electrically isolated from other elements.

Although not shown, the touch processor CP may be provided in the form of a chip, which is mounted on a portion of the touch panel 200 or on a printed circuit board connected to the touch panel 200.

FIG. 2 is a plan view illustrating a touch panel and a touch processor illustrated in FIG. 1.

Referring to FIG. 2, the sensing electrodes SE may be provided in the form of i×j matrix, where i and j are positive integers. For the sake of simplicity, for example, the sensing electrodes SE1-SE9 having a form of 3×3 matrix is described as an example. However, the number and shapes of the sensing electrodes are not limited thereto. In addition, each of the sensing electrodes SE1-SE9 is shaped like a rectangle when viewed in a plan view, as illustrated in FIG. 2.

The touch panel 200 may further include touch lines TL1-TL9 that connect the sensing electrodes SE1-SE9 with a touch processor CP. For example, each of the touch lines TL1-TL9 may be provided to connect a corresponding one of the sensing electrodes SE1-SE9 to the touch processor CP.

A portion of the touch lines, which are connected to a k-th column of the sensing electrodes SE1-SE9, may be disposed between the k-th column and a (k+1)-th column of the sensing electrodes SE1-SE9, where k is a positive number satisfying a condition of i≤k<j. Here, a specific column of the sensing electrodes SE1-SE9 may include a plurality of sensing electrodes that are arranged in a column direction. For example, in FIG. 2, touch lines TL1-TL3 are connected to sensing electrodes SE1-SE3 in a first column of the sensing electrodes SE1-SE9. A portion of the touch lines TL1-TL3 is disposed between the first column and a second column having sensing electrodes SE4-SE6 of the sensing electrodes SE1-SE9. A portion of each of the touch lines TL1-TL9 may be extended in the column direction.

The touch processor CP may be configured to provide sensing signals SG1-SG9 to the sensing electrodes SE1-SE9. The sensing signals SG1-SG9 may be current signals or voltage signals. Further, the touch processor CP may be configured to calculate or extract coordinates to which a touch event TCH is input (hereinafter, referred to as "touch coordinates") based on delay values of the sensing signals SG1-SG9. For example, compared with a case where any touch event TCH is not input, the delays of sensing signals SG1-SG9 may be increased when the sensing signal is generated from or passes through a particular sensing electrode to which a touch event TCH is input. This is because an RC time constant of the particular sensing electrode to which the touch event TCH is input is larger than that of other sensing electrodes to which the touch event TCH is not input.

The touch processor CP may provide the calculated or extracted touch coordinates to the display panel 100.

Figure 3:
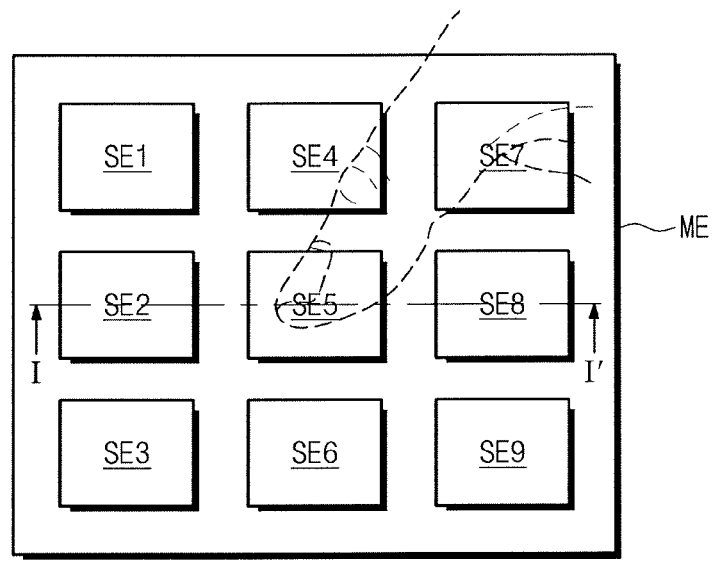
FIG. 3 is a plan view of the touch substrate illustrated in FIG. 1.
Figure 4:
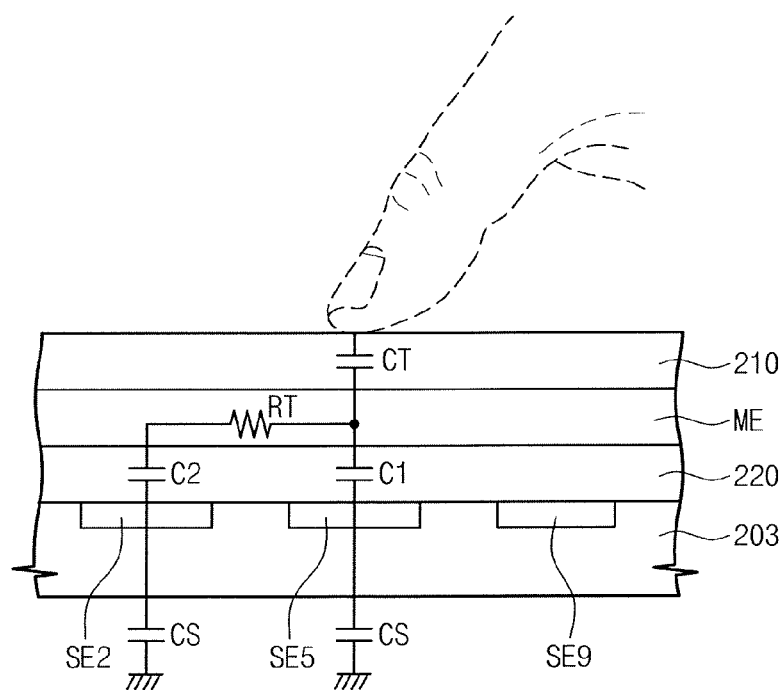
FIG. 4 is a sectional view taken along a line I-I' of FIG. 3.
Figure 5:
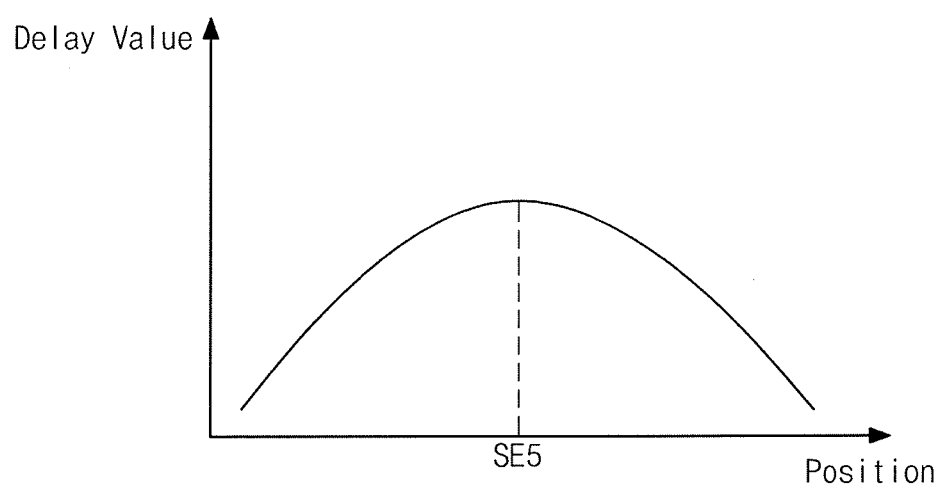
FIG. 5 is a graph showing a change in delay value of a sensing signal, depending on a position of a sensing electrode.

FIG. 3 is a plan view of the touch substrate 210 illustrated in FIG. 1, FIG. 4 is a sectional view taken along a line I-I' of FIG. 3, and FIG. 5 is a graph illustrating a change in delay value of a sensing signal, depending on a position of a sensing electrode. For the sake of simplicity, the touch lines TL1-TL9 are not illustrated in FIG. 3.

FIGS. 3 and 4 illustrate a case where a touch event TCH is input to the fifth sensing electrode SE5 by a user.

In this case, each of the sensing electrodes SE1-SE9 may form an intrinsic capacitor in conjunction with electrodes adjacent thereto, except for the conductive layer ME. For example, a first intrinsic capacitor CS1 may be formed between the second sensing electrode SE2 and electrodes EE1 adjacent to the second sensing electrode SE2 except for the conductive layer ME. A second intrinsic capacitor CS2 may be formed between the fifth sensing electrode SE5 and electrodes EE2 adjacent to the fifth sensing electrode SE5 except for the conductive layer ME. According to an exemplary embodiment of the present inventive concept, the first intrinsic capacitor CS1 and the second intrinsic capacitor CS2 may have substantially the same capacitance.

For example, as shown in FIG. 4, a first capacitor C1 may be formed between the fifth sensing electrode SE5 and the conductive layer ME, and a second capacitor C2 may be formed between the second sensing electrode SE2 and the conductive layer ME. According to an exemplary embodiment of the present inventive concept, the first capacitor C1 and the second capacitor C2 may have substantially the same capacitance.

Further, the sensing electrodes SE1-SE9 and the conductive layer ME may serve as resistors because they have finite electric resistances.

When the touch event TCH is input, a particular capacitor (hereinafter, referred to as a "touch capacitor CT") may be formed between a finger of a user USR and the conductive layer ME.

A portion of the conductive layer ME may serve as a touch resistor RT. A resistance of the touch resistor RT is given by a function of a distance between the sensing electrode (e.g., fifth sensing electrode SE5) to which the touch event TCH is input and the sensing electrode (e.g., second sensing electrode SE2) to which the touch event TCH is not input.

A delay value of a sensing signal applied to the second sensing electrode SE2 may be determined based on an RC circuit formed by a combined capacitance between the second capacitor C2, the touch capacitor CT, and the intrinsic capacitor CS, and a combined resistance between the touch resistor RT and an intrinsic resistor. In addition, a delay value of a sensing signal applied to the fifth sensing electrode SE5 may be determined based on another RC circuit formed by a combined capacitance between the touch capacitor CT, the first capacitor C1, and the intrinsic capacitor CS and the intrinsic resistor. For example, when the touch event is input through the fifth sensing electrode SE5, the RC circuit including the second sensing electrode SE2 may further include the touch resistor RT, compared with the RC circuit including the fifth sensing electrode SE5. Accordingly, a delay value of a sensing signal applied to the fifth sensing electrode SE5 may become different from a delay value of a sensing signal applied to the second sensing electrode SE2.

A delay value of a sensing signal of a particular sensing electrode may be decreased as a distance between the particular sensing electrode and the sensing electrode (e.g., fifth sensing electrode SE5) in which the touch event TCH occurs. As shown in FIG. 5, the delay value of the sensing signal may be decreased as the distance from a touch point (e.g., fifth sensing electrode SE5) is increased. For example, referring to FIG. 3, since a distance between the first and fifth sensing electrodes SE1 and SE5 is larger than that between the second and fifth sensing electrodes SE2 and SE5, a delay value of a sensing signal applied to the first sensing electrode SE1 may be smaller than that of a sensing signal applied to the second sensing electrode SE2.

Figure 6:
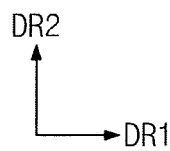
FIG. 6 is a diagram illustrating an arrangement of 7×7 sensing electrodes according to exemplary embodiment of the present inventive concept.
Figure 7:
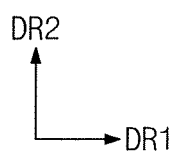
FIG. 7 is a diagram illustrating a difference in delay value of sensing signals measured from the sensing electrodes, respectively, of FIG. 6, before and after a touching event.
Figure 8:
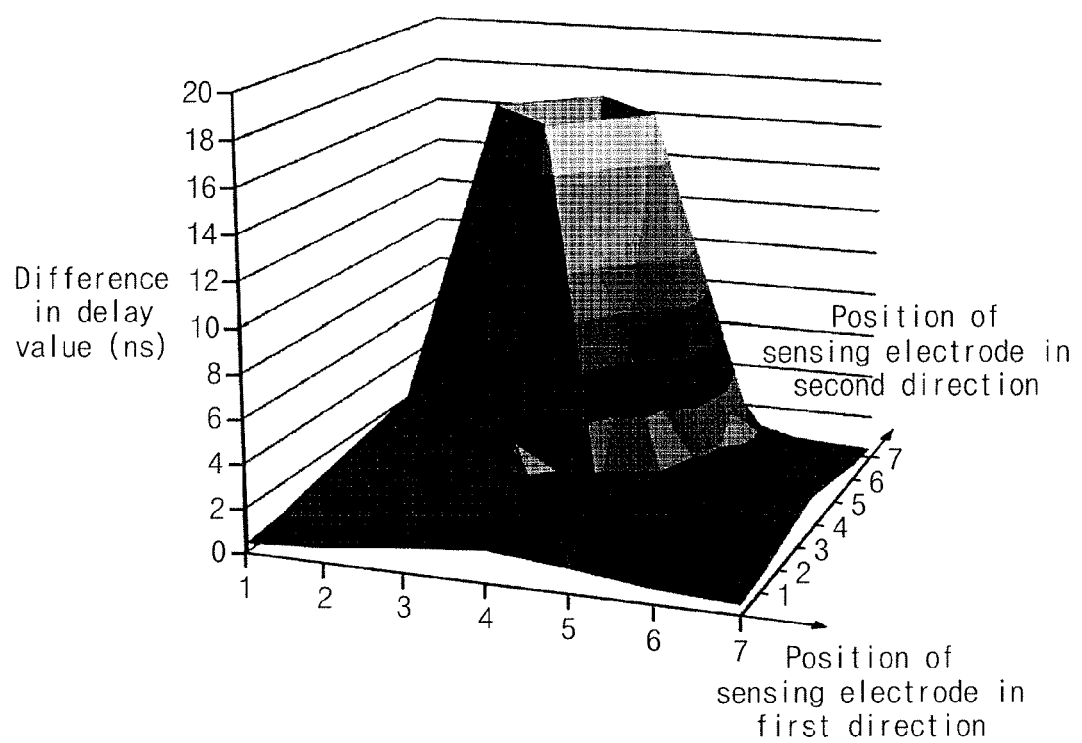
FIG. 8 is a three-dimensional graph illustrating the difference in delay value illustrated in FIG. 7.

FIG. 6 is a diagram illustrating an arrangement of 7×7 sensing electrodes that were used in simulation, FIG. 7 is a diagram illustrating a difference in delay value of sensing signals measured from the sensing electrodes, respectively, of FIG. 6, before and after a touching event, and FIG. 8 is a three-dimensional graph illustrating the difference in delay value illustrated in FIG. 7.

FIG. 6 illustrates 7×7 sensing electrodes SE1-SE49, which are arranged in first and second directions DR1 and DR2 crossing each other, and a center of each of the sensing electrodes SE1-SE49 is set as a position for measuring a delay value of the sensing signal. Here, a touch event may be assumed to occur at a twenty fifth sensing electrode SE25. Further, the conductive layer ME may be set to have a sheet resistance of 100 kΩ/□.

As shown in FIGS. 7 and 8, the delay values of the sensing signals of the sensing electrodes SE1-SE49 are decreased as distances between the sensing electrodes SE1-SE24 and SE26-SE49 and the twenty fifth sensing electrode SE25 are increased.

In a comparative example, when the display panel is provided without the conductive layer ME, only a sensing signal corresponding to the sensing electrode (e.g., twenty fifth sensing electrode SE25) to which the touch event is input may have different delay values before and after the touch event occurs.

In addition, according to an exemplary embodiment of the present inventive concept, not only the sensing signal corresponding to the sensing electrode (e.g., twenty fifth sensing electrode SE25) to which the touch event is input, but also the sensing signals corresponding to the sensing electrodes (e.g., SE1-SE24 and SE26-SE49) to which the touch event is not input may have different delay values before and after the touch event occurs. A position in which the difference in delay value before and after the touch event is highest may be a real position of the touch event, and this method may increase a touch-sensing sensitivity of the display device.

In addition, according to an exemplary embodiment of the present inventive concept, a size of each of the sensing electrodes to be formed in the display device may be increased, compared with a size of each of sensing electrodes in the comparative example. In the comparative example, when a size of each sensing electrode is increased, sensing distinctively two different touch events input to a single specific sensing electrode may be difficult because a position of each electrode is uniquely defined. In addition, according to an exemplary embodiment of the present inventive concept, since the delay value of the sensing signal is monitored not only at the sensing electrode in which the touch event is input, but also at other sensing electrodes adjacent thereto, a difference between the two different touch events onto the single specific sensing electrode, or between the two touch events and a single touch event may be distinguished.

Further, when a size of each sensing electrode is increased, the numbers of the sensing electrodes and the touch lines connected to the sensing electrodes may be decreased. Since a touch event might not be detected in a region of the touch lines, the decreasing of the touch lines may be understood that an undetectable touch area may be reduced in the display device according to an exemplary embodiment of the present inventive concept.

FIGS. 9A through 9E are three-dimensional graphs illustrating a difference in delay value according to a sheet resistance of a conductive layer in FIG. 4. For example, FIGS. 9A through 9E illustrates graphs when the sheet resistances of the conductive layers ME are 10 Ω/□, 10 kΩ/□, 50 kΩ/□, 100 kΩ/□, and 5000 kΩ/□, respectively.

Figure 9A:
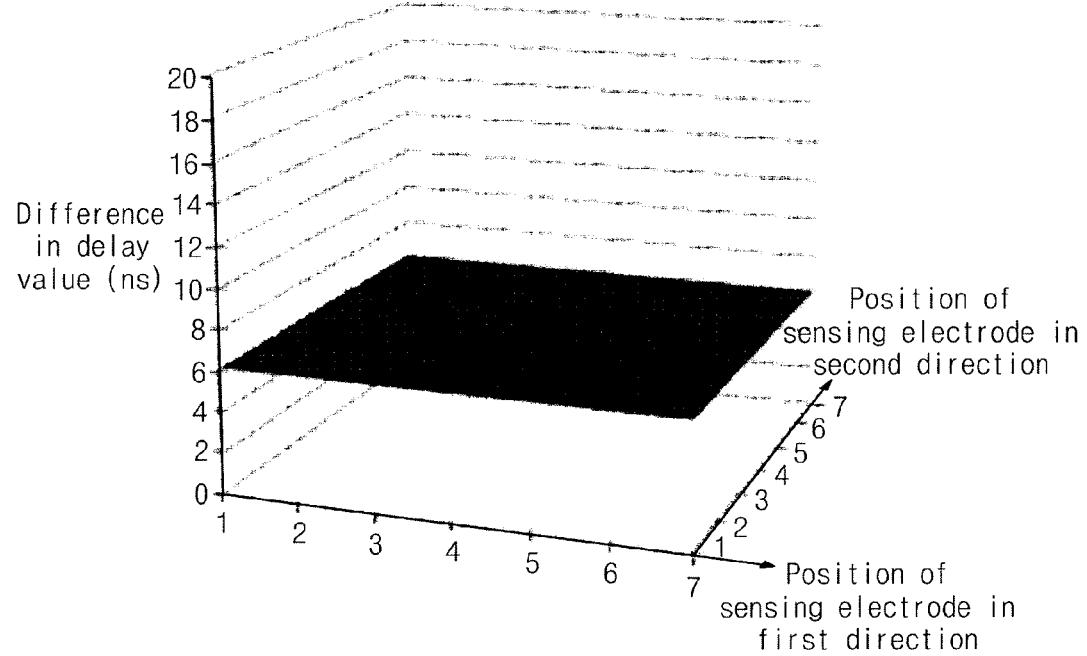
FIGS. 9A through 9E are three-dimensional graphs illustrating a difference in delay value according to a sheet resistance of a conductive layer in FIG. 4.
Figure 9B:
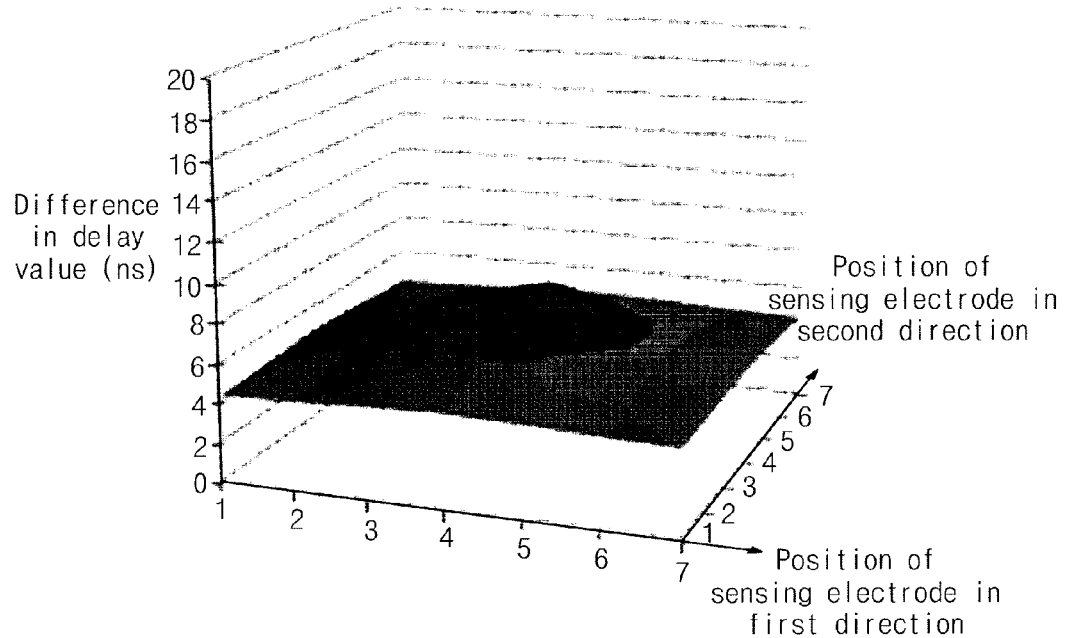
Figure 9C:
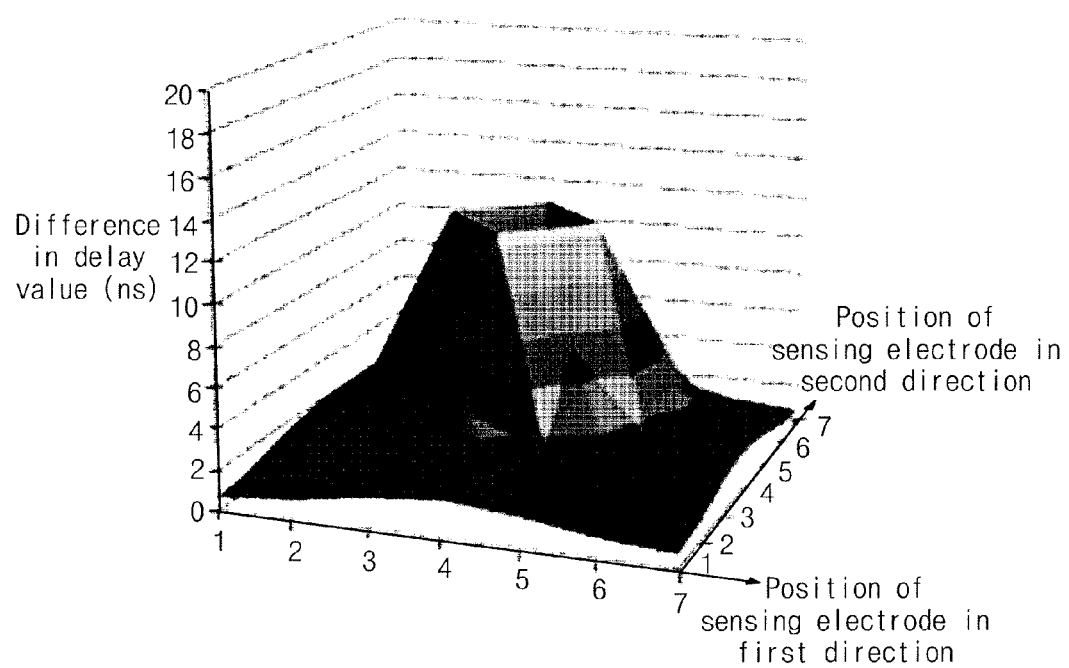

As shown in FIG. 9A, when the conductive layer ME has a too low sheet resistance (e.g., of 10Ω/□), a difference in delay value between sensing signals applied to adjacent sensing electrodes is too small to detect an associated touch event. In addition, as shown in FIG. 9E, when the conductive layer ME has a too high sheet resistance (e.g., 5000 kΩ/□), the conductive layer ME may have a similar electric property to that of an insulating material and thus, the sensing signals applied to adjacent sensing electrodes may a small difference in delay value to such an extent as to barely detect a position of an associated touch event.

Figure 9D:
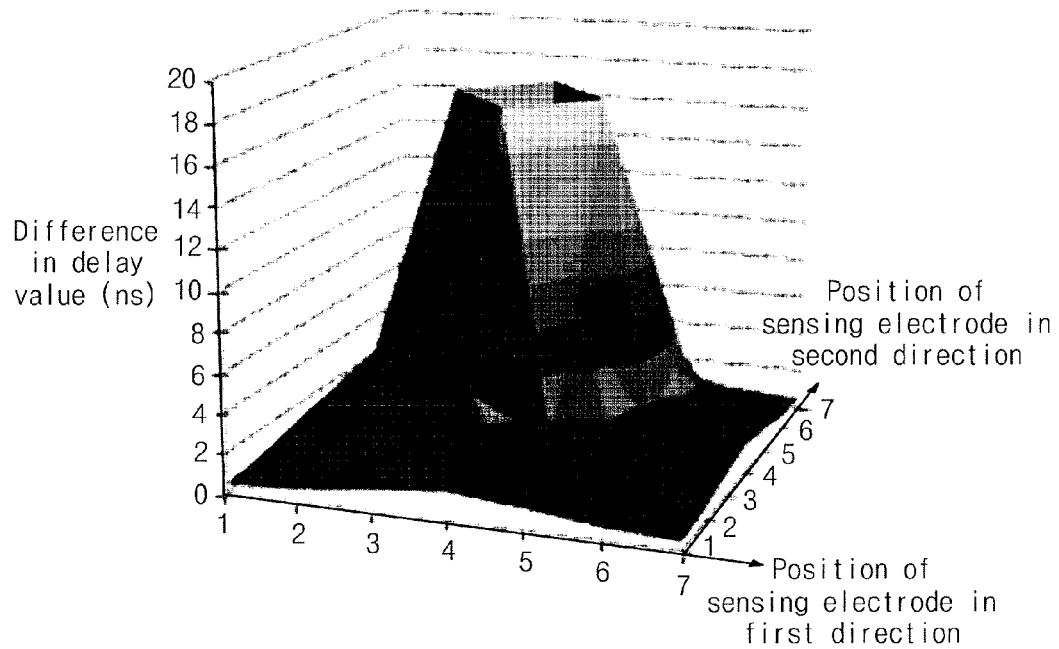
Figure 9E:
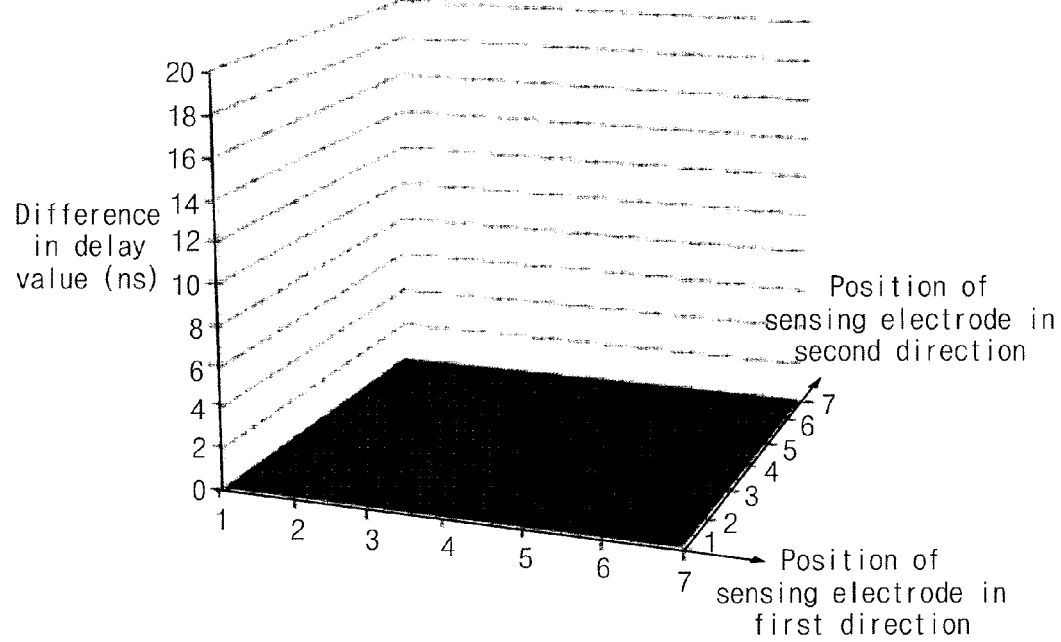

For example, the sensing signals applied to adjacent sensing electrodes have the maximum difference in delay value when the conductive layer ME has a sheet resistance of 100 kΩ/□, as shown in FIG. 9D and thus, a touch panel may have the highest sensing sensitivity. For example, the conductive layer ME may have a sheet resistance ranging from 50 kΩ/□ to 200 kΩ/□.

Figure 10:
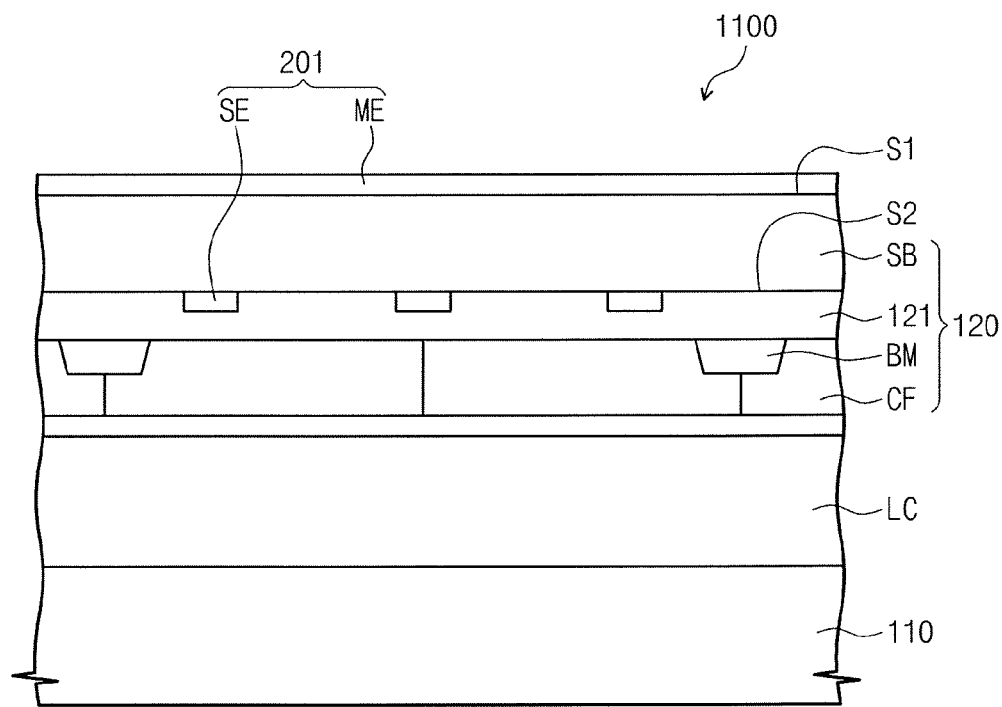
FIG. 10 is a sectional view illustrating a display device according to an exemplary embodiment of the present inventive concept.

FIG. 10 is a sectional view illustrating a display device according to an exemplary embodiment of the present inventive concept.

In the following description of FIG. 10, elements having similar to or the same reference numbers as the elements described with reference to FIGS. 1 through 5 may be omitted for the sake of brevity.

Referring to FIG. 10, a display device 1100 may include a display panel 100 and a touch panel 201.

The display panel 100 may include a first substrate 110, a second substrate 120, and a liquid crystal layer LC. The first substrate 110 and the second substrate 120 may be provided to face each other. For example, the liquid crystal layer LC may be disposed between the first substrate 110 and the second substrate 120.

The second substrate 120 may include an insulating substrate SB, an insulating layer 121, a black matrix BM, and a color filter CF.

The insulating substrate SB may have a top surface S1 and a bottom surface S2. The insulating substrate SB may include a transparent insulating material. The insulating layer 121 may be disposed on the bottom surface S2 of the insulating substrate SB. The black matrix BM may be disposed over the insulating layer 121. The color filter CF may be disposed on the black matrix BM.

For example, the insulating layer 121 may include an organic insulating material, an inorganic insulating material, or the like.

The touch panel 201 may include a conductive layer ME and sensing electrodes SE.

The conductive layer ME may be disposed on the top surface S1 of the insulating substrate SB. The sensing electrodes SE may be disposed between the bottom surface S2 of the insulating substrate SB and the insulating layer 121.

In the display device 1100 shown in FIG. 10, the touch panel 201 may be directly formed on the insulating substrate SB of the display panel without an additional touch substrate. Accordingly, the display device 1100 according to an exemplary embodiment of the present inventive concept may have a reduced thickness, compared with the display device 1000 previously described with reference to FIGS. 1 through 5.

Figure 11:
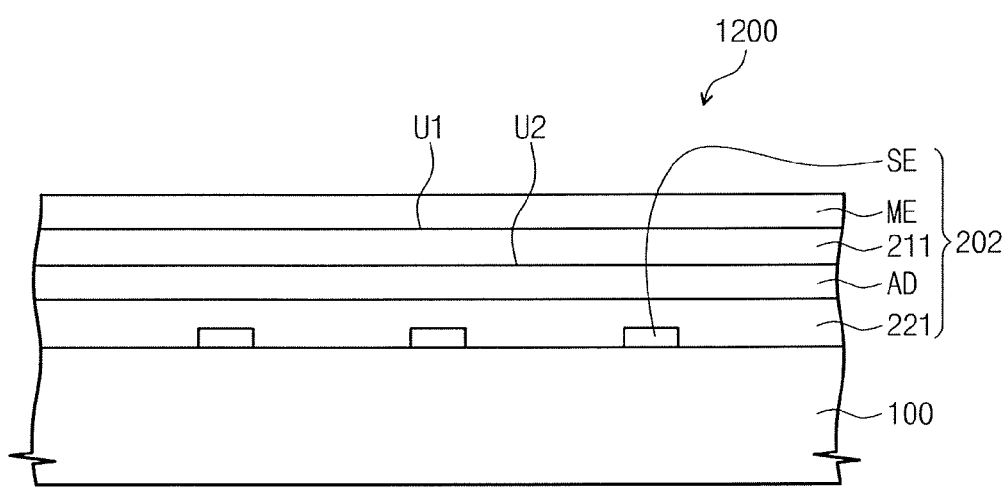
FIG. 11 is a sectional view illustrating a display device according to an exemplary embodiment of the present inventive concept.

FIG. 11 is a sectional view illustrating a display device according to an exemplary embodiment of the present inventive concept.

In the following description of FIG. 11, elements having similar to or the same reference numbers as the elements described with reference to FIGS. 1 through 5 may be omitted for the sake of brevity.

Referring to FIG. 11, a display device 1200 may include the display panel 100 and a touch panel 202.

The touch panel 202 may include a touch substrate 211, an adhesive layer AD, an insulating layer 221, a conductive layer ME, and sensing electrodes SE.

The touch substrate 211 may have a top surface U1 and a bottom surface U2. The adhesive layer AD may be formed on the bottom surface U2 of the touch substrate 211. For example, the insulating layer 221 may be disposed between the adhesive layer AD and the display panel 100.

For example, the insulating layer 221 may include an organic insulating material, an inorganic insulating material, or the like.

The adhesive layer AD may be formed of an OCA or OCR.

The conductive layer ME may be disposed on the top surface U1 of the touch substrate 211. The sensing electrodes SE may be provided on the display panel 100 and between the insulating layer 221 and the display panel 100.

The touch substrate 211 may include glass, PI, PC, PEN, PET, or the like.

In the display device 1200, for example, the insulating layer 221 may be disposed to face the display panel 100 through the adhesive layer AD interposed therebetween.

Figure 12:
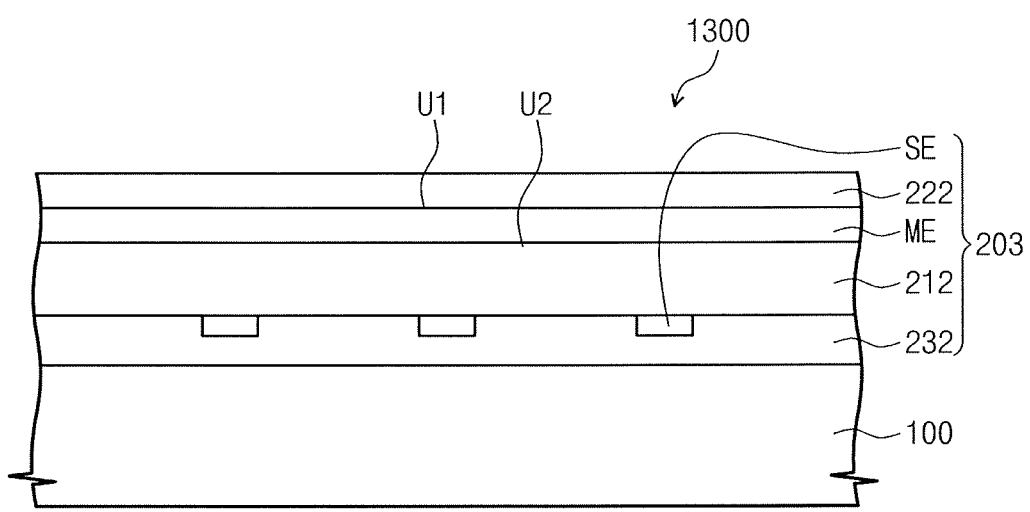
FIG. 12 is a sectional view illustrating a display device according to an exemplary embodiment of the present inventive concept.

FIG. 12 is a sectional view illustrating a display device according to an exemplary embodiment of the present inventive concept.

In the following description of FIG. 12, elements having similar to or the same reference numbers as the elements described with reference to FIGS. 1 through 5 may be omitted for the sake of brevity.

Referring to FIG. 12, a display device 1300 may include the display panel 100 and a touch panel 203.

The touch panel 203 may include a touch substrate 212, a first insulating layer 222, a second insulating layer 232, a conductive layer ME, and sensing electrodes SE.

The touch substrate 212 may have a top surface V1 and a bottom surface V2. The first insulating layer 222 may be disposed over the top surface V1 of the touch substrate 212. For example, the conductive layer ME may be disposed between the touch substrate 212 and the first insulating layer 222. The second insulating layer 232 may be disposed between the bottom surface V2 of the touch substrate 212 and the display panel 100.

Each of the first insulating layer 222 and the second insulating layer 232 may include an organic insulating material, an inorganic insulating material, or the like.

The touch substrate 212 may include glass, PI, PC, PEN, PET, or the like.

The sensing electrodes SE may be provided on the bottom surface V2 of the touch substrate 212 and between the second insulating layer 232 and the touch substrate 212.

According to exemplary embodiments of the present inventive concept, a touch-sensing sensitivity of a display device may be increased. In addition, a size of each of sensing electrodes on a touch panel may be increased and thus, the numbers of sensing electrodes and touch lines on the touch panels may be reduced. Thus, an undetectable area of the touch panel may be reduced.

Although the present inventive concept has been described with reference to exemplary embodiments thereof, it will be understood that the present inventive concept is not limited to the disclosed embodiments.

What is claimed is:

1. A touch-sensitive display device, comprising:
 a display panel including first and second substrates facing each other, wherein the display panel is configured to display images through the second substrate; and
 a touch panel disposed on the second substrate, wherein the touch panel is configured to detect a touch event, wherein the touch panel comprises:
 a plurality of sensing electrodes spaced apart from each other;
 a conductive layer electrically separated from the plurality of sensing electrodes;
 a touch substrate disposed on the conductive layer; and
 a touch processor configured to provide sensing signals to the plurality of sensing electrodes, through a plurality of touch lines, and to obtain touch coordinates to which the touch event is input by identifying a sensing electrode of the plurality of sensing electrodes that has a greatest difference in delay values between a time immediately prior to the touch event and a time concurrent with or immediately after the touch event and determining that the touch event as occurring at a vicinity of the identified sensing electrode having the greatest difference in delay values, wherein each sensing electrode of the plurality of sensing electrodes is connected to a corresponding touch line of the plurality of touch lines and the number of sensing electrodes of the plurality of sensing electrodes is equal to the number of touch lines of the plurality of touch lines.

2. The touch-sensitive display device of claim 1, wherein the plurality of sensing electrodes comprises a first sensing electrode to which the touch event is input, a second sensing electrode, and a third sensing electrode, wherein the touch event is not input to the second and third sensing electrodes, and a first delay value of a first sensing signal corresponding to the first sensing electrode and a second delay value of a second sensing signal corresponding to the second sensing electrode are different from each other.

3. The touch-sensitive display device of claim 2, wherein a third delay value of a third sensing signal corresponding to the third sensing electrode is smaller than the second delay value, wherein a distance between the first and third sensing electrodes is greater than a distance between the first and second sensing electrodes.

4. The touch-sensitive display device of claim 1, wherein the conductive layer substantially includes a transparent conductive material.

5. The touch-sensitive display device of claim 4, wherein the conductive layer comprises conductive polymers including PEDOT:PSS, oxide-based transparent conductive materials, or carbon-based transparent conductive materials.

6. The touch-sensitive display device of claim 5, wherein the oxide-based transparent conductive materials comprise indium-tin-oxide or indium-zinc-oxide.

7. The touch-sensitive display device of claim 5, wherein the carbon-based transparent conductive materials comprise carbon nanotube or graphene.

8. The touch-sensitive display device of claim 1, wherein the conductive layer has a sheet resistance of 200 kΩ/□.

9. The touch-sensitive display device of claim 1, wherein the touch panel further comprises:
a touch substrate to which the touch event is input;
a first insulating layer disposed on the conductive layer; and
a second insulating layer disposed between the first insulating layer and the second substrate,
wherein the conductive layer is disposed between the touch substrate and the first insulating layer, and the plurality of sensing electrodes is disposed between the first insulating layer and the second insulating layer.

10. The touch-sensitive display device of claim 9, wherein the plurality of touch lines is provided on the touch substrate to connect the plurality of sensing electrodes to the touch processor.

11. The touch-sensitive display device of claim 10, wherein the plurality of sensing electrodes is provided in a form of an i×j matrix, where i and j are positive integers.

12. The touch-sensitive display device of claim 11, wherein first touch lines connected to sensing electrodes in a k-th column of the i×j matrix among the plurality of touch lines are disposed between the k-th and (k+1)-th columns of the i×j matrix, where k is a positive integer satisfying a condition of i≤k<j, and a portion of each of the first touch lines is extended in a first direction parallel to the k-th column.

13. The touch-sensitive display device of claim 1, wherein the second substrate comprises:
an insulating substrate having a first surface and a second surface;
an insulating layer disposed on the second surface of the insulating substrate;
a black matrix disposed on the insulating layer; and
a color filter disposed on the black matrix.

14. The touch-sensitive display device of claim 13, wherein the conductive layer is disposed over the first surface of the insulating substrate, and the plurality of sensing electrodes is disposed between the insulating substrate and the insulating layer.

15. The touch-sensitive display device of claim 1, wherein the touch panel further comprises:
a touch substrate having a first surface and a second surface;
an adhesive layer formed on the second surface of the touch substrate; and
an insulating layer disposed on the adhesive layer, wherein the conductive layer is disposed on the first surface of the touch substrate, and the plurality of sensing electrodes is disposed between the insulating layer and the second substrate.

16. The touch-sensitive display device of claim 15, wherein the touch substrate includes glass, PI, PC, PEN, or PET.

17. The touch-sensitive display device of claim 1, wherein the touch panel further comprises:
a touch substrate having a first surface and a second surface;
a first insulating layer disposed on the first surface of the touch substrate; and
a second insulating layer disposed between the second surface of the touch substrate and the second substrate,
wherein the conductive layer is disposed between the touch substrate and the first insulating layer, and the plurality of sensing electrodes is disposed between the second insulating layer and the touch substrate.

18. A touch-sensitive input device, comprising:
a touch panel configured to detect a touch event, comprising a conductive layer and a plurality of sensing electrodes spaced apart from each other,
wherein the plurality of sensing electrodes is disposed between the conductive layer and the display panel,
wherein the conductive layer is electrically separated from the plurality of sensing electrodes,
wherein a plurality of sensing signals corresponding to the plurality of sensing electrodes has different delay values from each other depending on a position of each of the plurality of sensing electrodes,
wherein a first sensing electrode having a maximum change in delay value, among the plurality of sensing electrodes, front a time before the touch event to a time after the touch event, is determined as a position to which the touch event is input, and
wherein the delay value for each of the plurality of sensing electrodes is calculated based on an RC circuit formed by:
a combined capacitance between a capacitor formed by the conductive layer, the sensing electrode, and an insulating layer disposed therebetween, a touch capacitor of the touch substrate, and an intrinsic capacitor of a circuit for connecting the sensing electrode to the touch processor; and a combined resistance between a touch resistor of the conductive layer and an intrinsic resistor of the circuit for connecting the sensing electrode to the touch processor.

19. The touch-sensitive input of claim 18, wherein the conductive layer has a sheet resistance ranging from 50 k$\Omega$/☐ to 200 k$\Omega$/☐.

20. A touch-sensitive display device, comprising:
a display panel including first and second substrates facing each other, wherein the display panel is configured to display images through the second substrate; and
a touch panel disposed on the second substrate, wherein the touch panel is configured to detect a touch event, wherein the touch panel comprises:
a plurality of sensing electrodes spaced apart from each other;
a conductive layer electrically separated from the plurality of sensing electrodes;
a touch substrate disposed on the conductive layer; and
a touch processor configured to provide sensing signals to the plurality of sensing electrodes and to obtain touch coordinates to which the touch event is input by identifying a sensing electrode of the plurality of sensing electrodes that has a greatest difference in delay values between a time immediately prior to the touch event and a time concurrent with or immediately after the touch event and determining that the touch event as occurring at a vicinity of the identified sensing electrode having the greatest difference in delay values,
wherein the delay value for each of the plurality of sensing electrodes is calculated based on an RC circuit formed by:
a combined capacitance between a capacitor formed by the conductive layer, the sensing electrode, and an insulating layer disposed therebetween, a touch capacitor of the touch substrate, and an intrinsic capacitor of a circuit for connecting the sensing electrode to the touch processor; and
a combined resistance between a touch resistor of the conductive layer and an intrinsic resistor of the circuit for connecting the sensing electrode to the touch processor.

\* \* \* \* \*